United States Patent [19]

Pfeiffer

[11] 4,258,812
[45] Mar. 31, 1981

[54] SELF-CONTAINED PORTABLE ELECTRICALLY SENSED BATHROOM SCALE

[76] Inventor: John E. Pfeiffer, c/o Electronic Design Lab, 3 Great Pasture Rd., Redding, Conn. 06896

[21] Appl. No.: 255

[22] Filed: Jan. 2, 1979

[51] Int. Cl.³ .............................................. G01G 3/14
[52] U.S. Cl. ........................... 177/210 R; 177/DIG. 6
[58] Field of Search ....................... 177/210 R, DIG. 6

[56] References Cited

U.S. PATENT DOCUMENTS

| | | | |
|---|---|---|---|
| 3,061,026 | 10/1962 | Hecos et al. | 177/DIG. 6 |
| 3,247,915 | 4/1966 | Chilton . | |
| 3,303,347 | 2/1967 | Wingate . | |
| 3,627,069 | 12/1971 | Ray et al. | 177/DIG. 6 |
| 3,797,596 | 3/1974 | Tanji et al. | 177/210 R |
| 3,824,587 | 7/1974 | Fowler . | |
| 3,853,191 | 12/1974 | Yamagiwa | 177/210 R |
| 4,072,201 | 2/1978 | Wiesler | 177/DIG. 6 |

FOREIGN PATENT DOCUMENTS 2330416  1/1975  Fed. Rep. of Germany .... 177/DIG. 6

Primary Examiner—George H. Miller, Jr.

[57] ABSTRACT

A portable bathroom scale is described wherein an optical encoder is used to determine the scale displacement in an unambiguous manner. A convenient circuit is used to transform the optical code on an encoder disc to the code needed to activate a decimal display. A mechanism is described for automatically activating the encoder and display when a person steps on the scale and deactivate the mechanism when the person steps off the scale.

10 Claims, 7 Drawing Figures

U.S. Patent    Mar. 31, 1981    Sheet 1 of 4    4,258,812
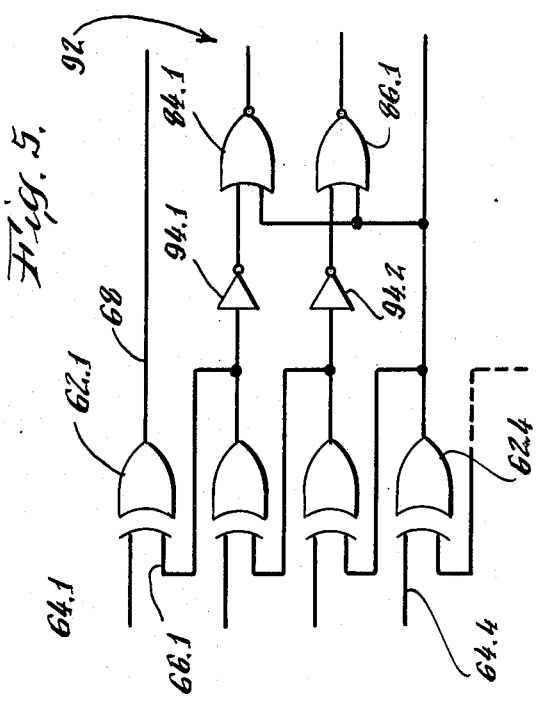
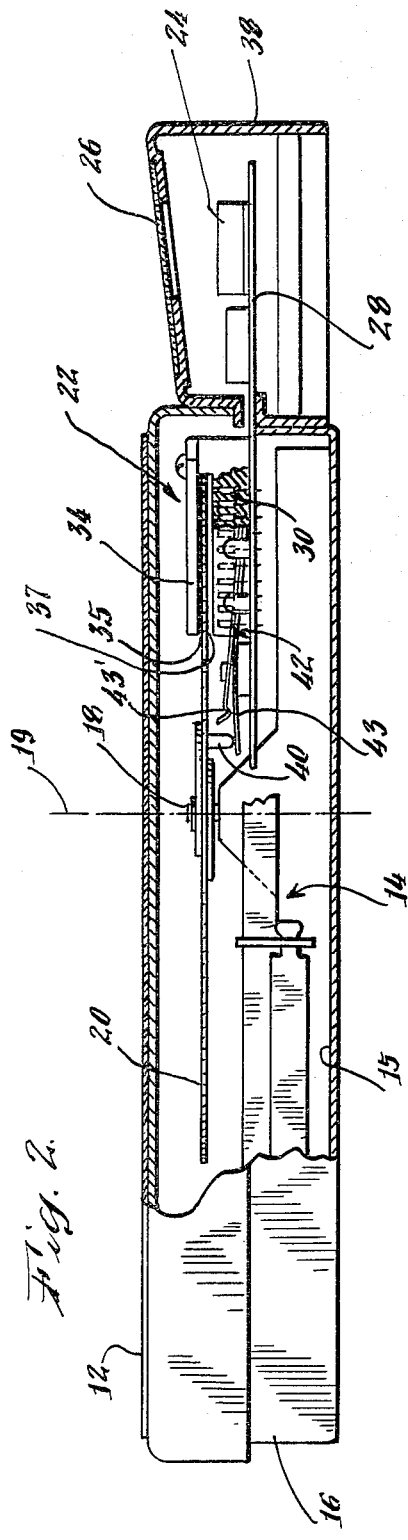
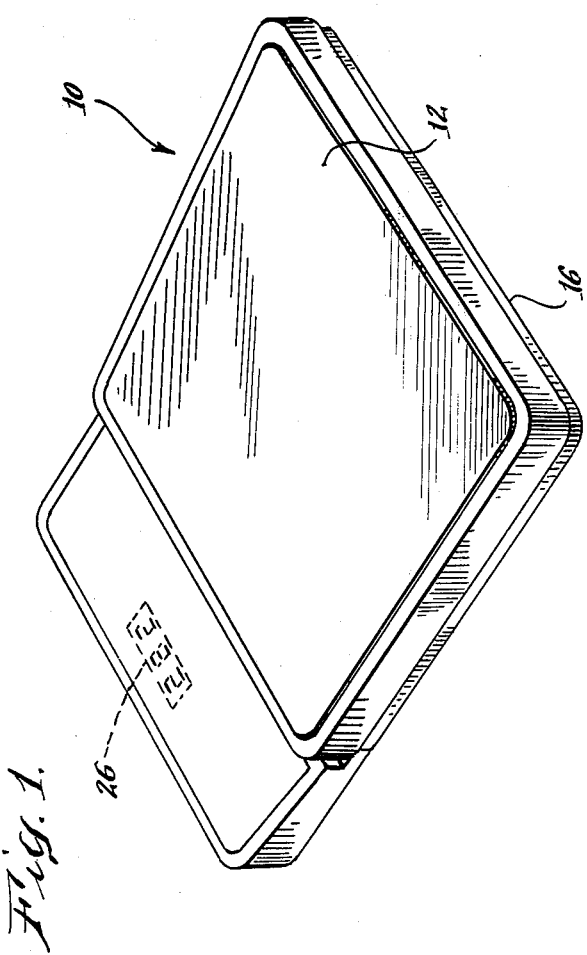

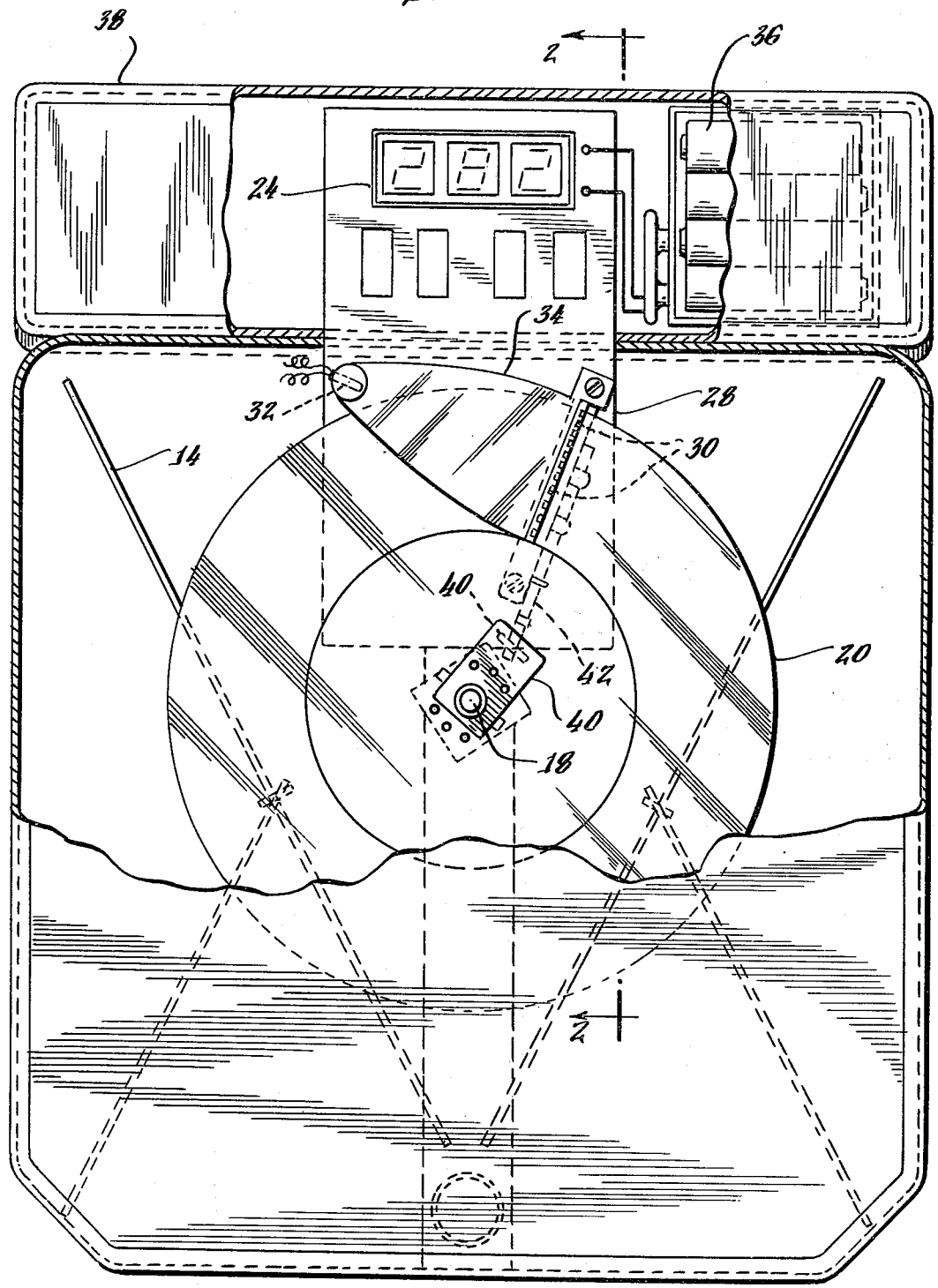

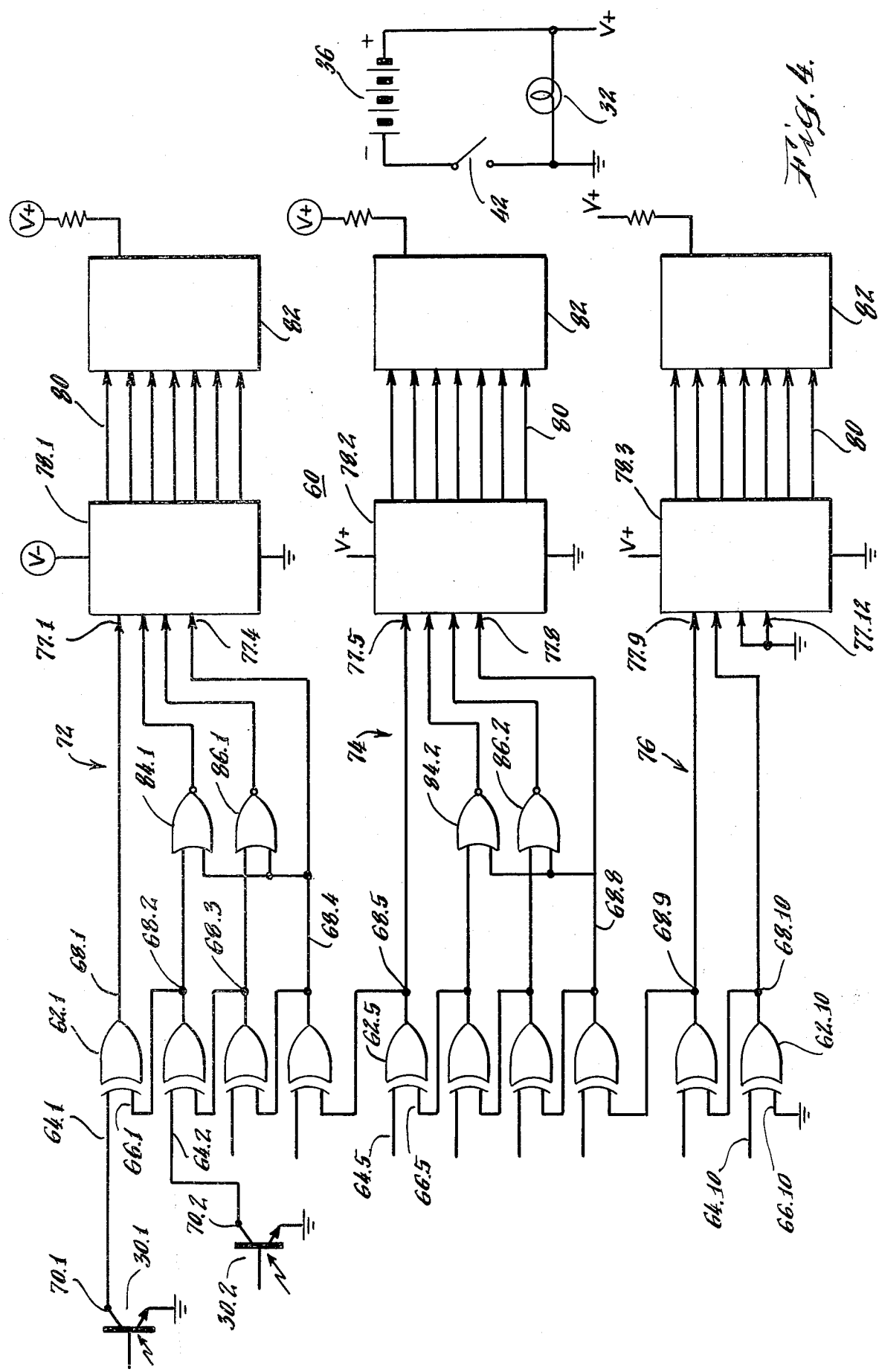

TABLE I

| | WHEEL CODE CHANNELS 1 & 2 | | 3-10 | | | | EXCLUSIVE OR OUTPUT | | | | BINARY CODE | | | |
|---|---|---|---|---|---|---|---|---|---|---|---|---|---|---|
| ZERO | | | 0 | 1 | 0 | 1 | 0 | 1 | 1 | 0 | 0 | 0 | 0 | 0 |
| 1 | | | 0 | 1 | 0 | 0 | 0 | 1 | 1 | 1 | 0 | 0 | 0 | 1 |
| 2 | | | 0 | 1 | 1 | 0 | 0 | 1 | 0 | 0 | 0 | 0 | 1 | 0 |
| 3 | | | 0 | 1 | 1 | 1 | 0 | 1 | 0 | 1 | 0 | 0 | 1 | 1 |
| 4 | | | 0 | 0 | 1 | 1 | 0 | 0 | 1 | 0 | 0 | 1 | 0 | 0 |
| 5 | | | 0 | 0 | 1 | 0 | 0 | 0 | 1 | 1 | 0 | 1 | 0 | 1 |
| 6 | | | 0 | 0 | 0 | 0 | 0 | 0 | 0 | 0 | 0 | 1 | 1 | 0 |
| 7 | | | 0 | 0 | 0 | 1 | 0 | 0 | 0 | 1 | 0 | 1 | 1 | 1 |
| 8 | | | 1 | 0 | 0 | 1 | 1 | 1 | 1 | 0 | 1 | 0 | 0 | 0 |
| 9 | | | 1 | 1 | 0 | 1 | 1 | 0 | 0 | 1 | 1 | 0 | 0 | 1 |
| 0 | 0 | 0 | | | | | 0 | 0 | | | 0 | 0 | 0 | 0 |
| 1 | 0 | 1 | | | | | 0 | 1 | | | 0 | 0 | 0 | 1 |
| 2 | 1 | 1 | | | | | 1 | 0 | | | 0 | 0 | 1 | 0 |

SELF-CONTAINED PORTABLE ELECTRICALLY SENSED BATHROOM SCALE

FIELD OF THE INVENTION

This invention relates to bathroom scales. More specifically, this inventin relates to bathroom scales in which an illuminated numerical display of the weight of a person is provided.

BACKGROUND OF THE INVENTION

Bathroom scales are well known, particularly those of the relatively flat type as illustrated in U.S. Pat. No. 3,547,212 having a platform overlying a weighing mechanism contained within a generally flat housing. The weighing mechanism converts the force produced by a person standing on the platform to a rotation of an output shaft in proportion to the person's weight. This output shaft rotation in conventional bathroom scales moves a scale disc past a window to indicate the weight of the person standing on the scale.

Bathroom scales in which an output shaft rotation is automatically sensed to provide an illuminated numerical display with an indication of the correct weight are known. See, for example, the U.S. Pat. No. 3,853,191 to Yamagiwa.

In this patent a weighing machine is shown and described with a digital display activated from an AC line source. An optically decodable encoder wheel is used and mounted on a shaft whose rotation is proportional to the weight measured by the scale. An optical reader is employed to detect the amount of rotation by sensing the optical codings on the encoder wheel and then generate an appropriate signal to a numerical display. Appropriate switches are used so that the device will not be electrically activated unless a weighing operation is actually being made.

The optically encoded wheel described in the Yamagiwa patent has a disadvantage in that several optical transitions between successive numerical positions of the code wheel may occur. Thus, if the scale happens to come to rest directly opposite such transition, an uncertainty in the numerical read-out is likely to occur, causing large variations in the weight indication.

Such uncertainty problem with optical encoders has been recognized and a so-called Gray code developed to avoid having more than a single optical transition between successive numerically different weight indicating positions. The optical scales shown and escribed in the U.S. Pat. Nos. 3,061,026 and 3,627,069 are exemplary of the use of such a binary optical code. In these patents the optical binary encodings are arranged in channels with the channel representative of the least significant increment representing a binary fraction. Only one channel has an optical transition between successive weight indicating positions within the weighing range of the scale.

A binary Gray code, as for example illustrated in U.S. Pat. No. 3,627,069, can be converted to a conventional, 8, 4, 2, 1 straight binary code by using a well-known technique involving exclusive OR circuits. These are each responsive to a binary digit in the Gray code and are interconnected in such manner as to generate the straight binary code.

The latter binary code is then, in turn, converted to a binary decimal code (bcd) in order to operate normally available numerical displays. Techniques and devices to provide this conversion are well known, but involve additional circuitry, thus adding to the cost of the optical encoder used in the bathroom scale.

SUMMARY OF THE INVENTION

In a bathroom scale in accordance with the invention an optical encoder is employed to measure rotation of an output shaft of a conventional weighing mechanism used in the bathroom scale. An encoder disc is used with optically detectable codings which are arranged in a special code format to simplify decoding of circuitry. The code formate used on the encoder disc is so selected that a set of signals which is derived from a reading of the code, can, with a simple modification, be directly applied as a binary decimal code to a conventional numeric display.

Another feature of a bathroom scale in accordance with the invention involves the use of battery power for the optical encoder and display to provide a self-contained fully portable bathroom scale which does not have to be connected to an AC live source. As a result, the bathroom scale formed in accordance with the invention is safe to use and yet capable of providing an illuminated display. Battery power is preserved by using a series connected power switch which is actuated by a cam mounted on the output shaft of the weighing mechanism. By carefully selecting the position of the power switch, electrical power is automatically disconnected below a minimum weight position of the platform while power is automatically provided after a person steps on the scale.

It is, therefore, an object of the invention to provide a portable, self-contained bathroom scale. It is a further object of the invention to provide a convenient, reliable and inexpensive optical encoder for use in a bathroom scale to provide an illuminated digital display of the weight of a person.

These and other objects of the invention can be understood with reference to the following description of a preferred embodiment described in conjunction with the drawings.

BRIEF DESCRIPTION OF DRAWINGS

FIG. 1 is a perspective view of the bathroom scale in accordance with the invention;

FIG. 2 is a partial vertical section view of a bathroom scale in accordance with the invention;

FIG. 3 is a plan paritally broken away view of a bathroom scale in accordance with the invention;

FIG. 4 is a schematic of an optical encoder and display network employed in connection with the bathroom scale in accordance with the invention;

FIG. 5 is a plan view of an optical encoder disc in accordance with the invention for use in measuring the angular position of an output shaft rotated by a weighing mechanism when a person stands on the bathroom scale of FIG. 1;

DETAILED DESCRIPTION OF EMBODIMENT

Figures 6, 7:
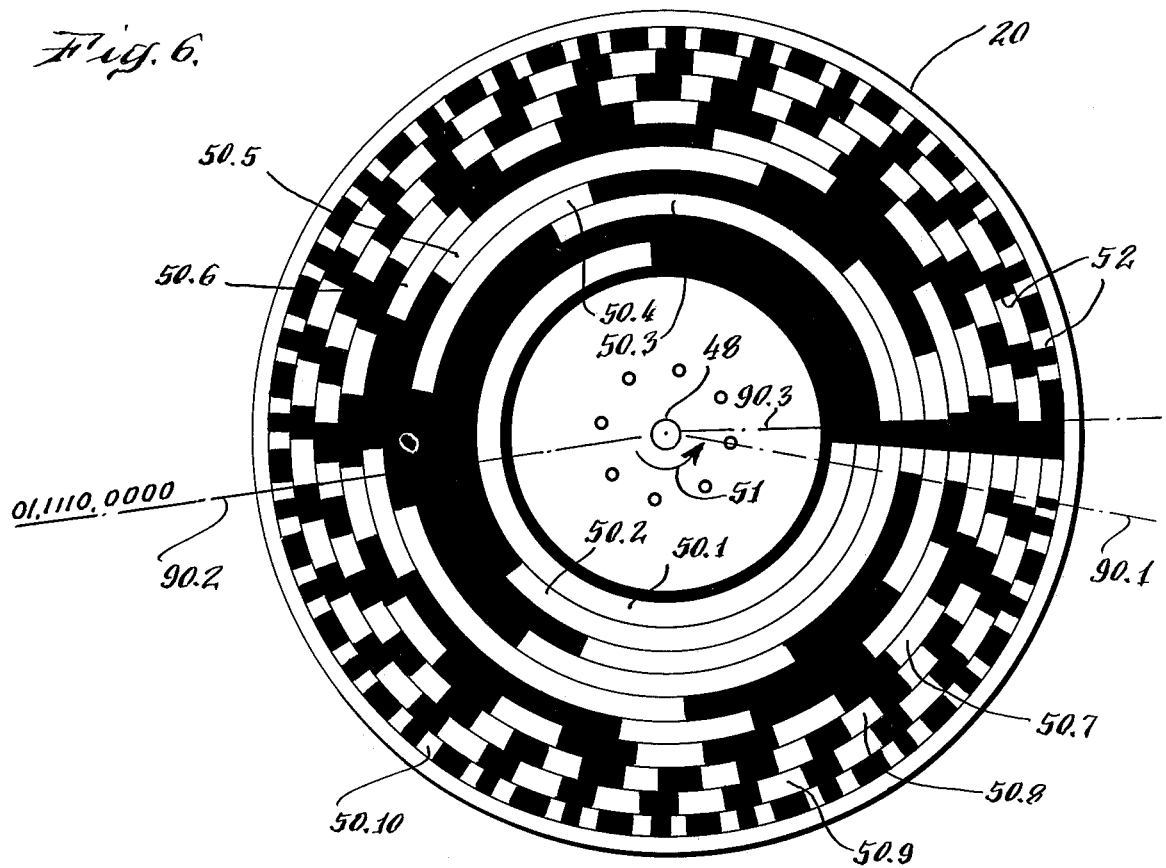
FIG. 6 is a schematic view of a portion of a modification of the network shown in FIG. 4.
FIG. 7 is a logic table relating display digits with various signal codes generated in the network shown in FIG. 4.

With reference to FIGS. 1 and 2, a bathroom scale 10 is shown with a rectangular generally flat shape having a weighing platform 12 overlying a conventional weighing mechanism 14 in main section 15 of a scale housing 16. The scale housing 16 includes the weighing mechanism 14 which responds to a weight placed on the platform 12 with a corresponding proportional rotation of an output shaft 18 about an axis 19. An optical encoder disc 20 in the form of a code wheel is coaxially mounted on the output shaft 18 to rotate therewith.

The encoder disc 20 is part of an optical shaft encoder generally indicated at 22 to measure output shaft rotation and provides an electrical signal indicative thereof. The electrical signal, which may be composed of a plurality of specially coded signals, is applied to a numerical digital display 24 to indicate the weight placed on platform 12 through a window 26.

As shown in FIGS. 2 and 3, the optical encoder 22 and numerical display 24 are located on a printed circuit board 28 which is mounted to scale housing 16. The optical encoder 22 includes a row of light sensitive cells 30 such as photocells arranged along a radial line from axis 19 below the encoder disc 20. A source of illumination is provided from bulb 32 mounted adjacent a light guide 34 which produces a radial band of light above the code wheel 20 of generally uniform intensity and in alignment with the row of photocells 30. The light guide preferably is made in a manner as is more particularly described in a copending patent application entitled "Light Distributor" filed by George N. Kringel and Nick Sachuk and assigned to the same assignee as for this invention. The light guide 34 is mounted in cantilever fashion to circuit board 28 with a pair of supports 35 so that a space 37 is provided through which encoder disc 20 may pass.

The bathroom scale is fully portable and self-contained by use of replaceable batteries 36, such as four A-sized cells located in an extension 38 of housing 16. In order to conserve battery power as well as remove weight indicating errors near the zero weight range, a cam 40 is mounted on output shaft 18 and disposed to open or close a normally closed switch 42 which is connected in series with batteries 36 and mounted on board 28. Cam 40 is so designed that when the output shaft 18 is near zero weight position, cam 40 depresses a contact 43 of switch 42 to open it and thus disconnect the batteries from the circuit on board 28.

The switch 42 preferably is formed with normally electrically engaged contacts 43-43' which require a very small force to separate. This is done by forming contacts 43, 43' of longitudinal metal strips which are aligned to extend along a radial direction at an angle towards cam 40. By limiting the engagement of cam 40 with switch 42 when the scale is not in use, a force tending to distort the weighing operation of mechanism 14 is avoided.

When a person steps on the scale, a shaft 18 is rotated so that cam 40 is moved away from switch 42 and it is permitted to close. Hence, optical encoder 22 and numerical display 24 are automatically activated when the person steps on the scale, but automatically turned off when the person steps off. One particular advantage of this technique is that scale 10 need not display low weights, near zero, so that the scale's accuracy in the weight range of importance, say above ten or twenty pounds, can be more reliably obtained.

With reference to FIG. 6, the encoder disc 20 is shown provided with ten concentric circular channels 50 of optically coded binary information which varies circumferentially upon rotation in a direction as indicated by arrow 51. The encoder disc 20 carries a binary decimal code format which is read along a radial line from the center 48 of encoder disc 20. Channels 50.1-50.2 represent the most significant whole integer digit up to a value of two hundred, channels 50.3-50.6 represent the tens digit and channels 50.7-50.10 represent the lowest whole integer digit. The maximum value represented by all channels 50 is 275 pounds, though higher values can be accommodated as well as metric weights.

The binary decimal code format represented by channels 50 is so formed that but a single optical transition, such as 52 occurs between successive digits. With such code the effect of any ambiguity arising when a transition happens to fall directly over photocells 30 is minimized and large fluctuations in the numerical digital display when the platform 12 is quiet are avoided.

The optical coding format on encoder disc 20 is further selected to minimize circuitry needed to provide proper binary coded decimal signals to the numerical display 24. The latter is actuated with conventional binary coded decimal (bcd) signals such as those listed in columns 54.11-14 in Table I of FIG. 7 with a conventional 8, 4, 2, 1 code. Such code would be adapted for the optical code format on encoder disc 20, but such code format would encounter multiple optical transitions 52 between successive weight indicating positions such as between digits 1 and 2 in FIG. 7.

For this reason, the optical code format on encoder disc 20 is altered to a modified Gray code with which only a single optical transition between successive weight indicating digit occurs while utilizing a conventional network of exclusive OR gates to convert the code format on the code wheel to the bcd code needed to activate numerical display 24.

FIG. 4 shows a network 60 used to convert the signals from photocells 30 to a bcd code for activating a numerical display 24. The network 60 includes a ladder arrangement of exclusive OR circuits 62 each of which has a pair of inputs 64, 66 and an output 68. Each output 66, which is representative of a higher order binary bit, is connected to an input 66 of the next lower order bit. The inputs 64.1-10 are each connected to a respective output 70 of a photocell 30 underlying a channel 50 of encoder wheel 20. The signals on inputs 64.1-10 thus correspond to the optical codings of channels 50.1-10 respectively.

The outputs 68 are arranged in groups 72, 74 and 76 on which corresponding binary coded decimal digit signals are generated and connected to decoders 68.1, 68.2 and 68.3. The decoders 78 convert their input bcd signals to discrete numeric display activating signals on lines 80 to activate conventional decimal digit displays 82.

The outputs representative of middle binary digits in the bcd signal groups 72 and 74 are each connected through corresponding inverters 84, 86 to a decoder 78. In addition the most significant binary digit outputs 68.4 and 68.8 in groups 72 and 74 are connected to inputs of inverters 84, 86 in their respective groups.

With an encoder disc 20 the circuitry as depicted in FIG. 4 can be advantageously kept to a minimum. This can be appreciated, for example, with reference to the particular optical encodings employed on code disc 20 as shown in FIG. 6.

The optical code employed on encoder disc 20 is shown with black or opaque segments equivalent to binary one and white or transparent segments representative of binary zero. The code can be derived with reference, for example, to a digit represented by the radial line 90.1. Along this line the code signals produced by photocells 30 in their outputs 70 or inputs 64 of circuits 62 is 00, 0101, 0101.

The signals produced on outputs 68 of exclusive OR circuits 62 are then 00, 0110, 0110. Since the middle digits for groups 72, 74 are inverted before the signals on outputs 68 are applied to decoders 78, the latter receive input signals of 00, 0000, 0000. Hence, for the radial line 90.1, the code wheel bears the code of zero pounds.

The Table I of FIG. 7 illustrates the coding format as employed on encoder disc 20 for the channels 50. Columns 54.1–54.6 correspond to signals on outputs 70 of photocells 30. Columns 54.7–54.10 correspond to signals on outputs 68 of exclusive OR circuits 62. Columns 54.11–54.14 correspond to the bcd signals applied to inuts 77 of decoder networks 78.

As an example, using radial line 90.2, the code on encoder disc 20 is 01, 1110, 0000 each binary bit of which corresponds respectively with the optical codings of channels 50.1–50.10. This code is transformed by exclusive OR circuits 62 to the code 01, 0100, 0000 on their outputs 68. Since inverters 84, 86 invert the middle binary digits on lines 68.2, 3, 6 and 7, the code applied to decoders 78 on their inputs 77 is 01, 0010, 0110 corresponding to the display of 126 pounds of weight.

As previously mentioned, the cam 40 is used to open switch 42 in a region near zero pounds to both disconnect power and avoid a need for precise scale alignment at zero weight. Hence, as illustrated in FIG. 4, battery power is prevented from being connected to the circuits until the encoder disc 20 is rotated in response to a weight in excess of a predetermined minimum amount. Hence, when scale 10 causes an output shaft rotation of an amount sufficient to remove the raised portion of cam 40 from contact with the switch arm, power is applied and a visible numerical display appears in the window.

The apparent multiple number of transitions 52 occurring along radial line 90.3 signify the transition of the maximum scale value (275) to a substantially different value. Since cam 40 is brought into contact with switch 42 beyond the maximum scale value, the switch 42 is opened and the numerical display is prevented from displaying erratic numbers beyond the scale's maximum value.

FIG. 5 illustrates a modification 92 of network 60 whereby the optical codings for the middle binary digit channels 50 such as 50.4, 5, 8 and 9 may be inverted. Such inversion does not alter the single optical transition characteristic between successive numerical weight positions on code disc 20. When such optical inversion is used, inverters 94 are used in series between the exclusive OR circuit outputs 68.2, 3 and OR inverters 84 and 86.

Having thus described a bathroom scale in accordance with the invention, its advantages can be appreciated. A digital numerical display of a person's weight is provided with minimum circuitry yet in an accurate and reliable manner.

What is claimed is:

1. In a bathroom scale having a platform on which a person can stand to be weighed by a weighing mechanism which indicates weight within a range with rotation of an output shaft in proportion to the person's weight, an optical shaft encoder used to sense ouput shaft rotation and a numerical illuminated display controlled with signals of a predetermined binary decimal code to visually indicate the sensed weight, the improvement comprising an optical encoder disc mounted on the output shaft for rotation thereby about an axis, said encoder disc bearing concentric channels of circumferentially successive optical binary digit codings, with cncentric channels being coded to represent at least three optically detectable binary coded decimal digits as detected along a radial direction from said axis;

with each channel having circumferentially distributed optical transitions between opposite binary codings, said optical binary codings for all of said channels being arranged to provide no more than a single optical transition between circumferentially successive binary coded decimal digits within the weight indicating range of the bathroom scale.

2. The bathroom scale as set forth in claim 1 wherein said optical encoder disc bears optical codings for at least two of said binary coded decimal digits in respectively two groups each of which is formed of four concentric channels, wherein said optical shaft encoder further includes means for producing channel signals individually representative of the optical codings of the channels;

a plurality of exclusive OR functioning circuits, each circuit having a pair of inputs and an output, one input being responsive to a channel signal and another input being responsive to an output of an exclusive OR functioning circuit used with a channel representative of a higher order binary digit;

an inverter placed in series with outputs of exclusive OR functioning circuits employed in middle order binary digits in each of said groups and with the most significant binary digit in each of said groups being coupled to inputs of said inverters employed in a related group to produce said predetermined binary decimal code to said numerical decimal display.

3. The bathroom scale as set forth in claim 1 and further including means actuated above a predetermined rotational weight indicating position of the output shaft for enabling generation of said numerical display.

4. The bathroom scale as set forth in claim 3 wherein the enabling means further includes a cam affixed to rotate with the output shaft; and a switch having an actuator arm for contact by the cam to open the switch below said predetermined rotational weight indicating position of the output shaft and enable closure of the switch above said latter output shaft position.

5. In a bathroom scale having a vertically movable platform supported by a weighing mechanism which is mounted in a scale housing to provide an output shaft rotation proportional with a weight placed on the platform, the improvement comprising a generally flat scale housing having an extension on one lateral side thereof and enclosing said weighing mechanism with its output shaft in a main section of the scale housing;

an optical encoder, said encoder including an optically coded encoder disc mounted on the output shaft for rotation thereby and means for producing a signal representative of the amount of rotation of the encoder disc relative to a minimum weight indicating position thereof;

a circuit board mounted in said main section below the encoder disc and having a portion extending into said housing extension;

said circuit board including a numerical digital display mounted on said circuit board portion and actuated by said signals, said scale housing extension having a window in alignment with the numerical digital display for viewing thereof to determine the weight place on the platform of the scale.

6. The bathroom scale as claimed in claim 5 wherein said scale housing extension is further provided with a battery to power said optical encoder and the numerical digital display;

a cam connected to rotate with the output shaft;

a switch operatively disposed for the cam, said switch being coupled in series with the battery to disconnect electrical power therefrom when the encoder disc is effectively rotated to a predetermined region near the minimum weight position of the output shaft and apply electrical power upon encoder disc rotation outside of said predetermined region.

7. The bathroom scale as claimed in claim 5 wherein said optical encoder includes a light guide and an array of light sensitive cells arranged along a radial line as measured from the axis of rotation of the encoder disc, said light guide providing a radial band of generally uniform intensity across said array of light sensitive cells.

8. The improved bathroom scale as set forth in claim 7 wherein said light guide is formed of a molded plastic material with a pair of supports for cantilever attachment to the circuit board to enable said encoder disc to operatively pass between the circuit board and said light guide.

9. In a bathroom scale having a vertically movable platform supported by a weighing mechanism which is mounted in a scale housing to provide an output shaft rotation proportional with a weight placed on the platform, the improvement comprising a generally flat scale housing enclosing said weighing mechanism with its output shaft;

a circuit board mounted in said housing;

an optical encoder partially mounted on said circuit board, said encoder including an optically coded encoder disc mounted on the output shaft for rotation thereby relative to the circuit board, and means supported by said circuit board for producing signals representative of the amount of rotation of the encoder disc relative to a minimum weight indicating position thereof;

a numerical digital display for connection to and actuation by said signals;

said signal producing means including a light guide mounted on the circuit board on one axial side of the encoder disc, and an array of light sensitive cells arranged on the other axial side of the encoder disc to sense light variations produced by optical codings on the encoder disc, said light guide providing a band of light of generally uniform intensity in alignment with the array of light sensitive cells;

a cam supported by said output shaft and extending towards said circuit board;

a switch mounted on the circuit board, said switch having a pair of contacts one of which extends towards said cam, and one contact being so located that said switch is actuated by the cam to effectively disable said optical encoder in the absence of the placement of a weight on the scale.

10. In a bathroom scale having a platform on which a person can stand to be weighed by a weighing mechanism which indicates weight within a range with rotation of an output shaft in proportion to the person's weight, an optical shaft encoder used to sense output shaft rotation and a numerical illuminated display controlled with signals of a predetermined binary code to visually indicate the sensed weight, the improvement comprising:

an optically encoded circular disc mounted for rotation about said shaft, said encoded disc bearing at least ten concentric channels, each channel having circumferentially successive optical binary digit codings with said concentric channels being coded to represent at least three places of optically detectable binary coded decimal digits as detected along a radial direction from said shaft, four of said concentric channels being encoded to represent a first place decimal digit, another four of said concentric channels being encoded to represent a second place decimal digit and another two of said concentric channels being encoded to represent a third place decimal digit;

optical decoding means for sensing the amount of rotation of said encoded disc about said shaft, said optical decoding means comprising a light guide providing a band of light having a generally uniform intensity and extending radially with respect to said shaft on one side of the disc and an array of at least ten light sensitive binary output cells positioned radially with respect to said shaft and in alignment with said light guide on another side of said disc, said cells being spaced apart to be each in alignment with a concentric channel;

each channel having circumferentially distributed optical transitions between opposite binary codings, said optical binary codings for said ten channels being arranged to provide precisely one optical transition between said circumferentially successive binary coded decimal digits.

* * * * *